United States Patent
Lee

(10) Patent No.: US 10,838,592 B2
(45) Date of Patent: Nov. 17, 2020

(54) TERMINAL AND METHOD FOR DETERMINING TYPE OF INPUT METHOD EDITOR

(71) Applicant: Pantech Corporation, Seoul (KR)

(72) Inventor: Sun Dong Lee, Seoul (KR)

(73) Assignee: PANTECH CORPORATION, Seoul (KR)

( * ) Notice: Subject to any disclaimer, the term of this patent is extended or adjusted under 35 U.S.C. 154(b) by 65 days.

(21) Appl. No.: 16/135,571

(22) Filed: Sep. 19, 2018

(65) Prior Publication Data

US 2019/0018560 A1    Jan. 17, 2019

Related U.S. Application Data

(63) Continuation of application No. 13/788,296, filed on Mar. 7, 2013, now abandoned.

(30) Foreign Application Priority Data

Aug. 17, 2012    (KR) .......................... 10-2012-0089918

(51) Int. Cl.
*G06F 17/00*       (2019.01)
*G06F 3/0484*      (2013.01)
(Continued)

(52) U.S. Cl.
CPC .......... *G06F 3/0484* (2013.01); *G06F 3/0233* (2013.01); *G06F 16/24* (2019.01); *G06F 40/166* (2020.01); *G06F 40/174* (2020.01)

(58) Field of Classification Search
CPC .............................. G06F 3/2037; G06F 3/0233
See application file for complete search history.

(56) References Cited

U.S. PATENT DOCUMENTS 5,944,790 A * 8/1999 Levy ...................... H04L 29/06
                                                    709/218
2002/0062342 A1   5/2002 Sidles
(Continued)

FOREIGN PATENT DOCUMENTS

| CN | 101916158 | 12/2010 |
|----|-----------|---------|
| CN | 102436454 | 5/2012  |
| JP | 2007-025808 | 2/2007 |

OTHER PUBLICATIONS

Tags for Identifying Languages, Philips et al., Google, Sep. 2009, pp. 1-84.

(Continued)

*Primary Examiner* — Andrew T McIntosh
(74) *Attorney, Agent, or Firm* — Capitol IP Law Group, PLLC

(57) ABSTRACT

A method for determining an input method editor in a terminal includes detecting a focus on an input field displayed on the terminal, analyzing information of the input field, determining a character type for the input field, setting input method editor corresponding to the determined character type, and outputting the set input method editor. A terminal includes an input detection unit to detect a focus on an input field, and an input method editor providing unit including an information analysis unit to analyze information of the input field, an input method editor determination unit to determine a character type for the input field, a database unit to store data related to the character type corresponding to the input field, and an input method editor output unit to output the input method editor corresponding to the determined character type.

8 Claims, 5 Drawing Sheets

(51) Int. Cl.
*G06F 16/24* (2019.01)
*G06F 3/023* (2006.01)
*G06F 40/166* (2020.01)
*G06F 40/174* (2020.01)

(56) References Cited

U.S. PATENT DOCUMENTS

| | | | |
|---|---|---|---|
| 2008/0271045 A1 | 10/2008 | Le Roy et al. | |
| 2009/0070098 A1* | 3/2009 | Patryshev | G06F 3/0238 704/3 |
| 2011/0087962 A1* | 4/2011 | Paddon | G06F 3/0237 715/265 |
| 2012/0226490 A1* | 9/2012 | Mashiah | G06F 3/0237 704/8 |
| 2012/0290967 A1 | 11/2012 | Scott et al. | |
| 2014/0035823 A1 | 2/2014 | Khoe | |
| 2014/0075367 A1* | 3/2014 | Abuelsaad | G06F 40/174 715/773 |

OTHER PUBLICATIONS

Extended European Search Report dated Jul. 1, 2016, corresponding to European Application No. 13159667.8.
"Input Types: Give Users the Right Keyboard on Mobile Forms", UX Movement, Aug. 23, 2011, XP055283354, URL:http://uxmovement.com/mobile/input-types-give-users-the-right-keyboard-on-mobile-forms/, 5 pages.
Kristin Bradley, "Mobile Web Design: Use HTML5 to trigger the appropriate keyboard for form inputs", Zoosk, Jul. 31, 2012, XP055283353, URL:http://aboutzoosk.com/en/engineering-blog/mobile-web-design-use-html5-to-trigger-the-appropriate-keyboard-for-form-inputs/, 5 pages.
Pamela Fox, "Triggering Numeric Keyboards with HTML5", May 2, 2012, XP055283359, URL:http://web.archive.org/web/20120615012326/http://blog.pamelafox.org/2012/05/triggering-numeric-keyboards-with-html5.html, 8 pages.
WingedFox, "A true-multilingual Virtual Keyboard with input translation support", JavaScript VirtualKeyboard Code Project, Mar. 25, 2009, XP055283360, URL:http://www.codeproject.com/Articles/17128/JavaScript-VirtualKeyboard?, 9 pages.
Non-Final Office Action dated Mar. 27, 2015; in U.S. Appl. No. 13/788,296.
Final Office Action dated Jan. 4, 2016, in U.S. Appl. No. 13/788,296.
Advisory Action dated Apr. 13, 2016, in U.S. Appl. No. 13/788,296.
Non-Final Office Action dated May 9, 2016, in U.S. Appl. No. 13/788,296.
Final Office Action dated Nov. 4, 2016, in U.S. Appl. No. 13/788,296.
Advisory Action dated Feb. 27, 2017, in U.S. Appl. No. 13/788,296.
Non-Final Office Action dated Aug. 30, 2017, in U.S. Appl. No. 13/788,296.
Final Office Action dated Mar. 30, 2018, in U.S. Appl. No. 13/788,296.
Examination Report dated Sep. 6, 2019, issued in European Patent Application No. 13159667.8.

* cited by examiner

```
<input type="text" class="txt_flid_no" name="Tax3832" id="Tax3832"
tabindex="43" maxlength="18" onFocus="this.select()"
onBlur="SetMoneyForm(document.tax.Tax3832,0);"
onKeyPress="EnterCheck(event);" value="0" title="SPECIAL DONATIONS
(EXCEPT FOR CHARITABLE TRUST)">WON</td>
```

FIG. 4

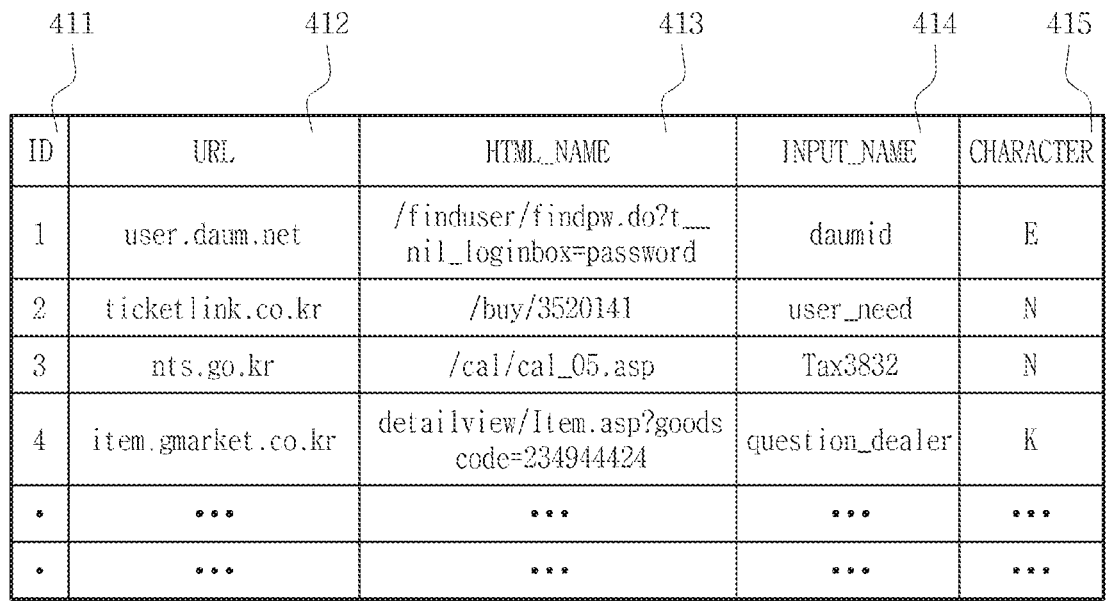

| ID | URL | HTML_NAME | INPUT_NAME | CHARACTER |
|---|---|---|---|---|
| 1 | user.daum.net | /finduser/findpw.do?t___nil_loginbox=password | daumid | E |
| 2 | ticketlink.co.kr | /buy/3520141 | user_need | N |
| 3 | nts.go.kr | /cal/cal_05.asp | Tax3832 | N |
| 4 | item.gmarket.co.kr | detailview/Item.asp?goods code=234944424 | question_dealer | K |
| . | ... | ... | ... | ... |
| . | ... | ... | ... | ... |

FIG. 5

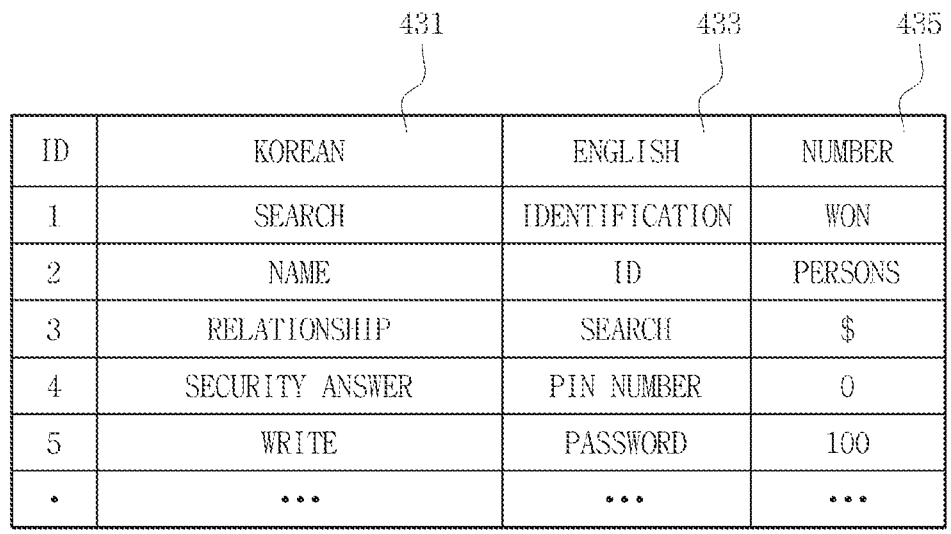

| ID | KOREAN | ENGLISH | NUMBER |
|---|---|---|---|
| 1 | SEARCH | IDENTIFICATION | WON |
| 2 | NAME | ID | PERSONS |
| 3 | RELATIONSHIP | SEARCH | $ |
| 4 | SECURITY ANSWER | PIN NUMBER | 0 |
| 5 | WRITE | PASSWORD | 100 |
| . | ... | ... | ... |

TERMINAL AND METHOD FOR DETERMINING TYPE OF INPUT METHOD EDITOR

CROSS-REFERENCE TO RELATED APPLICATION

This application is a Continuation of U.S. patent application Ser. No. 13/788,296, filed Mar. 7, 2013, and claims priority to and the benefit under 35 U.S.C. § 119(a) of Korean Patent Application No. 10-2012-0089918, filed on Aug. 17, 2012, the entire disclosures of which are incorporated herein by reference for all purposes.

BACKGROUND

Field

The following description relates to a terminal and a method for determining a type of an input method editor that may be used to input information.

Discussion of the Background

During web browsing on a mobile device, when a user gives a focus to an input field on a web browser that waits for an information input, the focus is detected and an input method editor (IME), which may be a virtual soft keyboard, is displayed. In an example, the focus may be provided by touching or clicking on a target input field.

Here, due at least in part to characteristics of the mobile device having the web browser with which web surfing is possible, there is a limitation on the screen size, and thus the virtual keyboard may not be able to display various types of characters that may be available, which may include Korean, English, numbers, and the like, on a single screen. Therefore, the input method editor is set to a single type of characters or character type to be shown. A process of displaying such an input method editor on a terminal is as follows.

When a user executes a web browser and the user places a cursor onto or over a particular input field that is capable of receiving a user input, the web browser recognizes the focus or location of the cursor with respect to the input field and displays an IME to receive a user input. Here, the displayed IME may be set to a keyboard form having a configuration that includes particular types of characters (i.e., Korean, English, numbers, or special characters).

Here, after recognizing the focus on the input field, the web browser receives and reads the input type of the input field in a code that specifies the input field. The code may be provided in a Hyper Text Markup Language (HTML) format in which the corresponding input field is defined. The web browser analyzes the defined input type using the code.

After analyzing the input type of the input field, the web browser retrieves an input type used in the operating system (OS) of the mobile device corresponding to the retrieved input type of the input field, sets the character type of the IME corresponding to the retrieved input type to be displayed. Accordingly, the set IME is shown on a User Interface (UI) as a soft keyboard.

In current techniques, when information is inputted in an input field that is capable of receiving a user input during web browsing in a mobile device, and if a web designer of a corresponding web page specifies an input type on an HTML code to have a specific character type to be inputted in the corresponding input field, the IME is set to the specified character type and is displayed as a default when the IME is displayed.

However, when the input fields are shown during web browsing on current mobile devices, one or more input types are set to "TEXT" input type, which is a default value. The reason for such input types is that web pages are generally designed based on performing web browsing on personal computers (PCs). On PCs, since keyboards are generally used with both hands, a switch between Korean, English, and numbers may be a simple process and a simultaneous input of characters and numbers in a single keyboard may be possible. Therefore, the web page designers may not consider input types of input fields.

Therefore, when a user performs web browsing using a mobile device in Korea and provides input on a web browser provided thereon, a virtual keyboard may be set to Korean as a default, which is a default character type of an IME corresponding to a default input type of "TEXT", and shown on an UI. A user, however, may input identification (ID) information, a password, a search term, a quantity/number input, and the like during web browsing. Therefore, if characters other than Korean have to be inputted, there is a problem in that the user has to manipulate the corresponding IME to change the IME to the different character type and then start the input.

SUMMARY

Exemplary embodiments of the present invention provide a terminal and a method for determining a type of an input method editor that may be used to input information.

Additional features of the invention will be set forth in the description which follows, and in part will be apparent from the description, or may be learned by practice of the invention.

Exemplary embodiments of the present invention provide a method for determining an input method editor in a terminal including detecting a focus on an input field displayed on the terminal; analyzing information of the input field; determining a character type for the input field; setting input method editor corresponding to the determined character type; and outputting the set input method editor.

Exemplary embodiments of the present invention provide a terminal including an input detection unit to detect a focus on an input field; and an input method editor providing unit including an information analysis unit to analyze information of the input field, an input method editor determination unit to determine a character type for the input field, a database unit to store data related to the character type corresponding to the input field, and an input method editor output unit to output the input method editor corresponding to the determined character type.

Exemplary embodiments of the present invention provide a method for determining a type of input method editor in a terminal including detecting a focus on an input field displayed on the terminal; analyzing information of the input field; querying an activity history database to determine whether data related to the character type of the input field is present, and performing a first determination process if the data is present; extracting an associated word from the information of the input field, querying an associated word database unit for data related to the associated word, and performing a second determination process if the queried data is present; extracting a keyword from the information of the input field, querying the associated word database unit for data related to the keyword, and performing a third determination process if the queried data is present; and determining the type of input method editor to be outputted based on at least one of the first determination process, the second determination process, and the third determination process.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 4 illustrates a table of information stored in an activity history database unit according to an exemplary embodiment of the present invention.

FIG. 5 illustrates a table of information stored in an associated word database unit according to an exemplary embodiment of the present invention.

DETAILED DESCRIPTION OF THE ILLUSTRATED EMBODIMENTS

Figure 1:
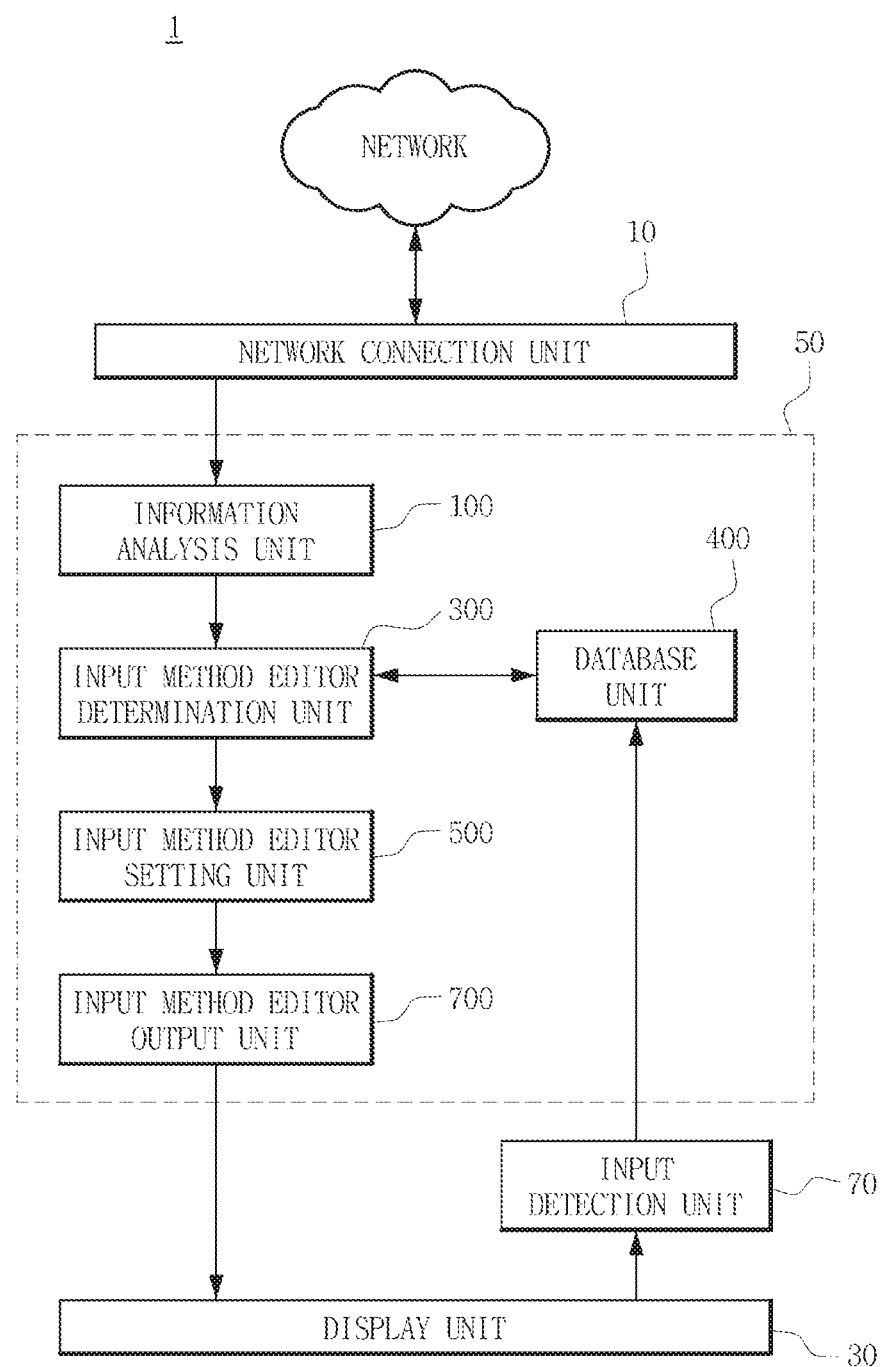
FIG. 1 is a block diagram of a terminal to determine a type of an input method editor according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, and structures. The relative size and depiction of these elements may be exaggerated for clarity.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

Figures 2, 3:
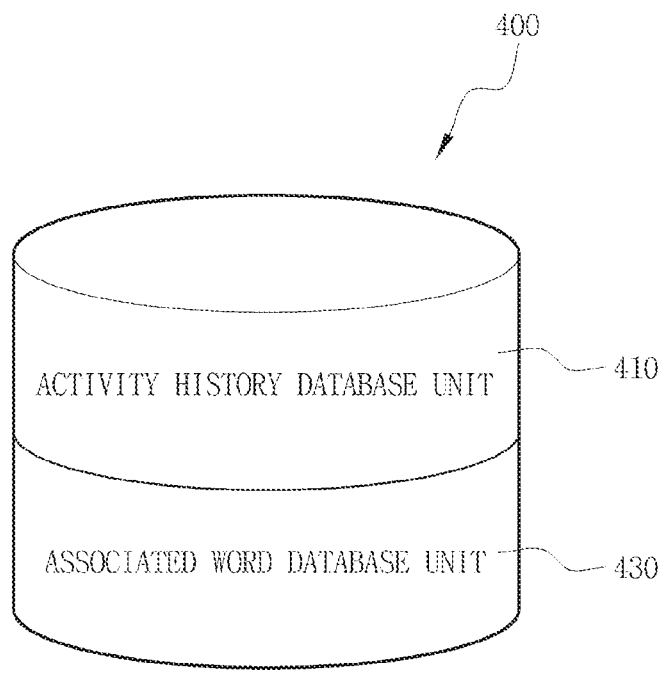
FIG. 2 illustrates information related to an input field read by an information analysis unit according to an exemplary embodiment of the present invention.
FIG. 3 is a block diagram of a database unit according to an exemplary embodiment of the present invention.

FIG. 1 is a block diagram of a terminal to determine a type of an input method editor according to an exemplary embodiment of the present invention. FIG. 2 illustrates information related to an input field read by an information analysis unit according to an exemplary embodiment of the present invention. FIG. 3 is a block diagram of a database unit according to an exemplary embodiment of the present invention. FIG. 4 illustrates a table of information stored in an activity history database unit according to an exemplary embodiment of the present invention. FIG. 5 illustrates a table of information stored in an associated word database according to an exemplary embodiment of the present invention.

Referring to FIG. 1, terminal 1 includes a network connection unit 10, which may be connected to a network to enable communication, a display unit 30, which may display an image provided by the terminal 1, an input method editor providing unit 50, which may display an input method editor on the display unit 30 to receive a user input, and an input detection unit 70, which may detect the user input on the display unit 30. The network may be an external network, which may be wired or wireless, and the input method editor may be a virtual soft keyboard.

When a focus is given to an input field that may be capable of receiving an information input at least during a web browsing session or while an application is executed by the terminal 1, the terminal 1 may determine and provide an appropriate type of the input method editor for the input field. According to aspects of the invention, focus may be provided by touching or clicking on the input field, or by moving a cursor over the input field.

The input field may be an edit box in which information may be inputted. The input field may also be called a text box. Examples of input field may include, without limitation, boxes or fields in which ID and password may be inputted during a login operation to a web page or an application, search boxes or fields in which search word may be inputted, boxes or fields in which birth date and phone number may be inputted, and boxes or fields in which a web page address may be inputted.

The type of the input method editor may be determined at least according to type of characters or character type that may be inputted in the input field. According to aspects of the invention, the input method editor may be configured to English when the input field is associated with login information, such as user identification (ID), password, and the like. The input method editor may be configured to both Korean and special characters when the input field is associated with a search operation in which a search word may be inputted. The input method editor may be configured to numbers when the input field is associated with at least one of personal information, such as birth date, phone number, and the like. The determined input method editor may be provided as the virtual keyboard for the user. In addition, the input method editor may be configured to both English and special characters, such as the at mark (@) when inputting an e-mail address. The input method editor may be configured to both English and special characters, such as a slash mark (/), when inputting a web page address. The determined input method editor may be provided as a virtual keyboard. Although described above as English, Korean, numbers, and special characters, aspects need not be limited thereto such that the input method editor may be configured to other languages, e.g., a first language or a second language; fonts; symbols; characters; and the like.

The terminal 1 may be a touchscreen-type terminal that may receive information by detecting a touch on the display unit 30. The touch on the display unit 30 may be provided by a user's hand, a touch pen, or the like. The terminal 1 may provide the input method editor as a virtual soft keyboard to the display unit 30. However, aspects of the invention are not limited thereto, such that the terminal may be at least one of a capacitive type, a pressure reduction type, an optical type, an ultrasonic wave type, a resistive film type, and the like.

When the terminal 1 is a touchscreen type, mobile terminals such as smartphones, tablet computers, netbooks, personal digital assistants (PDA), portable media players (PMP), the PlayStation Portable (PSP), MP3 players, e-book readers, navigation systems, digital cameras, electronic dictionaries, and electronic watches, and other electronic devices, such as desktop computers, smart televisions (TVs), corded and cordless telephones, smart door locks, automated teller machines (ATMs) of banks, ticket machines, and the like may be included.

In addition, the terminal 1 may execute various applications based on the operating system (OS). The OS may include various OSs that may be mounted in mobile computing devices, such as Android® OS, iOS® of Apple, Windows® Mobile OS, Bada® OS, Symbian® OS, and BlackBerry® OS.

The application may be a program developed to execute a particular operation. The application may include various application programs, which may include, without limitation, multimedia contents, such as games, videos, and photographs and execution programs, such as cameras, image viewers, and video players that execute the multimedia contents.

Web browsing in the terminal 1 may be executed through a web browser, which may include, without limitation, Chrome®, Internet Explorer® (IE), Firefox®, Safari®, Netscape®, Opera®, Mozilla®, and the like may be used.

The input method editor providing unit 50 may provide the input method editor to be set according to a type of characters or character type to be inputted in the input field when a focus is given to the input field during a web browsing session or execution of an application in the terminal 1. Referring again to FIG. 1, the input method editor providing unit 50 includes an information analysis unit 100, an input method editor determination unit 300, a database unit 400, and an input method editor output unit 700. The input method editor providing unit 50 may further include an input method editor setting unit 500.

The input method editor providing unit 50 may be provided in the framework of the operating system of the terminal 1. However, aspects are not limited thereto, such that the input method editor providing unit 50 may be provided independent of the framework of the operating system. The framework may include a set of classes, methods, functions, and documents that may be logically bound, and may be referenced to develop programs.

The information analysis unit 100 may obtain and/or analyze the information of the input field when a focus is detected on the input field. For example, a user may provide a focus to the input field in order to input information to the input field in a webpage while the terminal 1 executes web browsing. To provide focus, the user may touch or click on the input field that may be capable of receiving an input.

When the focus is detected on the input field, the information analysis unit 100 may read and analyze information of the input field, which may be configured to receive a particular character type or input, and provide the analyzed information to the input method editor determination unit 300. The information of the input field may refer to information related to the input field, which may include an input type of the input method editor, and may be provided as a Hyper Text Markup Language (HTML) code (see FIG. 2). However, aspects of the invention are not limited thereto, such that the information of the input field may be provided in other markup languages or codes.

Referring to FIG. 2, the input type in the analyzed information is set to a default value of "TEXT". Based on the determined input type of "TEXT", the information analysis unit 100 may read the address value of a web page in which the input field that receives the focus is present, and may perform a parsing operation thereon. The address value of the web page may be split into a front part and a rear part. However, address value of the web page may be split into additional parts. In an example, a slash mark (/) may be a first separator to split the address value into two temporary strings, and the name element in the HTML code that specifies the input field may be provided additional temporary string. The information analysis unit 100 may provide information related to the three analyzed strings to the input method editor determination unit 300.

When the input type in the analyzed information is set to a particular character type, the information analysis unit 100 may suspend further analysis and provide the analyzed information to the input method editor determination unit 300.

Further, when the input type in the analyzed information is determined to be set to a particular character type, the information analysis unit 100 may provide, directly or indirectly, the analyzed information to the input method editor setting unit 500 or the input method editor output unit 700 instead of providing the analyzed information to the input method editor determination unit 300.

The input method editor determination unit 300 may determine the type of characters to be inputted in the input field based on the information of at least one of the input field provided from the information analysis unit 100 and data of the database unit 400.

When the input type of the input field is determined to be set to a particular character type, the input method editor determination unit 300 may determine the input type of the operating system of the terminal 1 corresponding to the particular character type as the character type.

For example, input types used in the Android® OS may include, without limitation, NORMAL_TEXT_FIELD=0, TEXT_AREA=1, PASSWORD=2, SEARCH=3, EMAIL=4, NUMBER=5, TELEPHONE=6, URL=7, and the like. When the input type is NORMAL_TEXT_FIELD=0, the input type may refer to characters (TEXT). When the input type is TEXT_AREA=1, the input type may refer to a plurality of rows of characters. Here, Korean (e.g., when the terminal is located in Korea) or English may be set as a default value, which may be determined as the character type. The default value may be set according to a location country, which may correspond to a location of the terminal 1 or source of the webpage being called. The location country may use the country's own language (e.g., English for USA, Japanese for Japan, and Chinese for China). However, aspects of the invention are not limited thereto, such that the user may set the default value, or the default value may be set according to a region or other indicator of location.

When the input type is PASSWORD=2, numbers may be determined as the character type, and when the input type is SEARCH=3, special characters (e.g., a magnifying glass symbol or image) that may represent a search operation or capability along with Korean or English may be determined as the character type. Similarly, when the input type is EMAIL=4 or URL=7, English and special characters (e.g., an at mark (@) and a slash mark (/)) that may be used to input an e-mail or a web page address may be determined as the character type. When the input type is NUMBER=5 or TELEPHONE=6, numbers may be determined as the character type.

Further, when the input type is determined to be set to a text input type, which may be the default value, the input method editor determination unit 300 may determine appropriate character type to be inputted in a corresponding input field based on the data stored in the database unit 400. However, aspects of the invention are not limited thereto, such that different input type may be determined as the default value or a user may specify a different input type. This will be described in more detail as follows.

The database unit 400 may store data related to character types corresponding to the input field. As illustrated in FIG. 3, the database unit 400 may include an activity history database unit 410, and may further include an associated word database unit 430.

The activity history database unit 410 may store activity histories of the input field and may store data related to the input field and character types inputted in the input field. In addition, the activity history database unit 410 may store data related to the input field and input method editor types corresponding to the input field.

FIG. 4 illustrates an example of the configuration of the activity history database unit 410, which may include five information fields including ID 411, URL 412, HTML_NAME 413, INPUT_NAME 414, and CHARACTER 415. The information may be collected and stored for at least one input field of a web page or an application connected while the user executes web browsing or the application. The configuration of the activity history database unit 410 is not limited to this and may store additional information.

More specifically, the ID 411 may refer to unique information of the input field that the user inputs, and may sequentially be increased when information is stored. However, aspects of the invention are not limited thereto, such that the ID 411 may be randomly generated to be stored. The URL 412 may refer to a domain name. The domain name may refer to a first portion of a web address before a dividing slash mark (/), such as the first slash mark, which may be the first separator in the address of a web page in which the corresponding input field may be present. However, aspects of the invention are not limited thereto, such that the URL 412 may be applicable to an application using a file path and the use of slash marks may not be limited to the first slash mark. The HTML_NAME 413 may refer to an address after the dividing slash mark (/), which may be the first separator in the address of the web page in which the corresponding input field may be present.

The INPUT_NAME 414 may refer to a string determined as the name of the input field in a code that specifies the input field from the HTML code of the web page in which the corresponding input field may be present. For example, the INPUT_NAME 414 may have a value of "Tax3832", which may correspond to a portion of data string that indicates "name="Tax3832"" in FIG. 2. The INPUT_NAME 414 may refer to a part that defines the name of the corresponding input field. The CHARACTER 415 may refer to a type of characters that may be inputted in the corresponding input field. The CHARACTER 415 may refer to a type of characters determined by the input method editor determination unit 300 and inputted in the corresponding input field. In addition, when the user changes the input method editor from Korean (K), which may be a default character type, to English (E) or numbers (N), the CHARACTER 415 may be changed.

The input method editor determination unit 300 may compare information of an input field that waits for an input with the data of the activity history database unit 410 and may determine a type of characters to be inputted in the input field.

More specifically, the input method editor determination unit 300 may receive information related to the input field that receives focus from the information analysis unit 100, and makes a query into the activity history database unit 410 using the received information.

When data corresponding to the information of the input field is retrieved by the activity history database unit 410, the input field that currently waits for an input may be determined to have received an input.

Therefore, the type of characters to be inputted in the input field may be determined based on the data obtained in response to the query into the activity history database unit 410. The data obtained in response to the query may correspond to the data stored in the information field of the CHARACTER 415. Further, Korean (K), English (E), and numbers (N) character types that had been inputted in the input field by the user may be determined as the type of characters to be inputted in the input field. This process is a first determination process of determining the type of characters to be input to the input field.

When the type of characters to be inputted in the input field is determined in the first determination process, the input method editor determination unit 300 may end the input method editor determination process and notify the input method editor setting unit 500 or the input method editor output unit 700 of the determined character type.

The input method editor setting unit 500 may set the input method editor to the determined character type, and the input method editor output unit 700 may output the input method editor, which may be set to the determined character type, to the display unit 30. Accordingly, the input method editor may be displayed as a User Interface (UI) on the display unit 30, and the user may input information through the input method editor.

Further, when data that is matched to the information of the corresponding input field is not retrieved by the activity history database unit 410, a second determination process of determining a type of characters to be input to the input field may be performed.

In the second determination process, the input method editor determination unit 300 may retrieve, from the associated word database unit 430, data related to an associated word extracted from the information of the input field. The input method editor determination unit 300 may determine the type of characters to be inputted in the input field based on the retrieved data.

More specifically, an associated word, from which the character type may be inferred, may be extracted from the information of the input field and a query may be made into the associated word database unit 430 for the associated word. The associated word may refer to a code or information that may describe or supplement information to be inputted in the input field. The associated word may be provided within a reference proximity of the input field, such as in front of, behind, above, or below the input field. Further, the associated word may be provided in the information of the input field, which may be provided, without limitation, as a HTML code.

For example, the associated word may be at least one of a string, such as title, label, or tag, which may be displayed in front of or behind the corresponding input field on a web page (e.g., [associated word] [input field], [input field] [associated word], or [associated word] [input field] [associated word]). The string or label displayed in front of the input field may include, without limitation, "name", "identification", "ID", "password", "PASSWORD", "PW", "age", "resident registration number", "telephone number", "cellphone number", "amount", "tax amount", and the like. The string or label displayed behind the input field may include, without limitation, "dollars", "persons", "pieces", "pages", "sheets", or other labels that may represent units of quantity, and special characters, such as "\", "$", and "%" representing various units.

The input method editor determination unit 300 may provide or store the information of the input field in a temporary string variable, perform parsing thereon, split a string in the HTML code, and extract character units. The string may be split using, without limitation, double quotation marks (" ") or angle brackets (< >).

The extracted character units may be associated words. When the associated words are present in the associated word database unit 430, the input method editor determination unit 300 may determine the character type of a category to which the associated word may belong as the type of characters to be inputted in the input field. This process may be a second determination process of determining the type of characters to be inputted in the input field.

To perform the second determination process, associated words that may correspond to a character type may be stored in the associated word database unit 430. FIG. 5 illustrates an exemplary configuration of the associated word database unit 430, in which character type categories including Korean 431, English 433, and numbers 435 are present and associated words corresponding to each of the categories are stored.

For example, associated words, such as "search", "name", and "relationship" may be capable of receiving an input of Korean 431. Associated words, such as "identification", "ID", and "password" may be capable of receiving an input of English 433. Associated words, such as "dollars", "persons", and "$" may be capable of receiving an input of numbers 435. However, aspects of the invention are not limited thereto, such that the associated word database unit 430 may be configured to store other information.

The input method editor determination unit 300 may extract associated words. Further, the information analysis unit 100 may extract associated words to be provided to the input method editor determination unit 300.

When the type of characters to be inputted in the input field is determined in the second determination process, the input method editor determination unit 300 may end the input method editor determination process and notify the input method editor setting unit 500 of the determined character type. Similarly, the input method editor setting unit 500 may set the input method editor to the determined character type, and the input method editor output unit 700 may output the set input method editor to the display unit 30.

Further, when data that is matched to an associated word is not retrieved by the associated word database unit 430, a third determination process of determining a type of characters to be inputted in the input field may be performed.

In the third determination process, the input method editor determination unit 300 may retrieve data related to a keyword extracted from the information of the input field from the associated word database unit 430, and may determine the type of characters to be inputted in the input field based on the retrieved data.

More specifically, a keyword from which the character type may be inferred is extracted from the information of the input field, and a query may be made into the associated word database unit 430 for the keyword. The keyword may refer to a code or information that may provide examples or exemplary format of information to be inputted in the input field. The keyword may be translucently displayed or displayed in a greyed out manner in an input field on a web page or an application. The keyword may be provided in the information of the input field, which may be provided, without limitation, as a HTML code.

For example, the keyword may refer to exemplary information to be inputted in an input field to consider user convenience and/or may reduce a likelihood of incurring a mistake of inputting different information from the intention of a designer during designing of a web page. Examples thereof may include "0" in a when a number is to be input and "Hong Gil-Dong" when a name is to be inputted. Further, the keyword may be instructional information, which may guide or direct a user to input a particular type of information. Examples of such keywords may include, without limitation, "enter resident registration number" when a resident registration number has to be input and "security answer", "write more than 200 bytes" when Korean is to be inputted.

The input method editor determination unit 300 may specify a value item in the HTML code, which may be information of the input field. The value item may be included in the HTML or may not be included therein based on the intention of the designer.

The input method editor determination unit 300 may parse again the HTML code that may be parsed in the second determination process to find a string of the value. When string of the value is found, a value included in double quotation marks (" ") next to "value=" (e.g., "0" in the case of FIG. 2) may be read and stored in an arbitrary string. The arbitrary string may be parsed again according to spacing information to be generated as a combination of one or more words.

The one or more words are keywords, and a query may be made into the associated word database unit 430 for the keywords. When the keywords are present in the associated word database unit 430, the character type of a category to which the keywords may belong may be determined as the type of character to be inputted in the input field. This process may be a third determination process of determining the type of characters to be input to the input field.

The input method editor determination unit 300 may extract keywords. Further, the information analysis unit 100 may extract keywords to be provided to the input method editor determination unit 300.

When the type of characters to be inputted in the input field is determined in the third determination process, the input method editor determination unit 300 may end the input method editor determination process and may notify the input method editor setting unit 500 of the determined character type. Similarly, the input method editor setting unit 500 may set the input method editor to the determined character type, and the input method editor output unit 700 may output the set input method editor to the display unit 30.

When data corresponding to a keyword is not retrieved by the associated word database unit 430, the input method editor determination unit 300 may determine that it may be difficult, unlikely, or impossible to determine the type of characters to be inputted in the input field. If such determination is made, the associated word database unit 430 may determine a character type designated as a default value as the type of characters to be input to the input field. This process may be a fourth determination process of determining a type of characters to be input to the input field.

Further, the character type having a default value may be set according to a location of the terminal 1, source of the webpage or application, or information of the webpage or application corresponding to the input field. More specifically, the character type may be set to the country's own language, which may pertain to the location or source of the webpage or application (e.g., English for USA, Japanese for Japan, and Chinese for China). Further, a user may also set the default value.

The input method editor determination unit 300 may sequentially perform the processes of determining a type of characters to be inputted in the input field as described above. The user may select, at various processing stages, the character type, such that the input method editor determination unit 300 may preferentially determine the character type selected by the user as the character type of the input method editor.

The input method editor setting unit 500 may set the input method editor to the determined character type, and the input method editor output unit 700 may output the set input method editor to the display unit 30. The user may apply a touch to the output input method editor to input information to the corresponding input field. The input detection unit 70 may detect the user input and may notify the activity history database unit 410 of this, and data related to the input field and the type of characters inputted in the input field may be stored in the activity history database unit 410.

In addition, the user may change the character type of the input method editor by applying a touch to the output input method editor. The input detection unit 70 may detect the user input and may notify the activity history database unit 410 of the user input, and data related to the input field and the changed character type may be stored in the activity history database unit 410.

The data stored in the activity history database unit 410 as described above may be used as comparison data in the process of determining a type of characters to be inputted in the input field by the input method editor determination unit 300.

According to an exemplary embodiment, data related to an input field that had received a user input or data related to associated words or keywords from which a type of characters to be input to the input field may be stored. Further, the type of characters to be input to the corresponding input field may be determined using the data. Therefore, since the input method editor may be set and outputted based on the automatically determined text type, a process of changing the input method editor to another appropriate text type by the user may be omitted.

Figure 6:
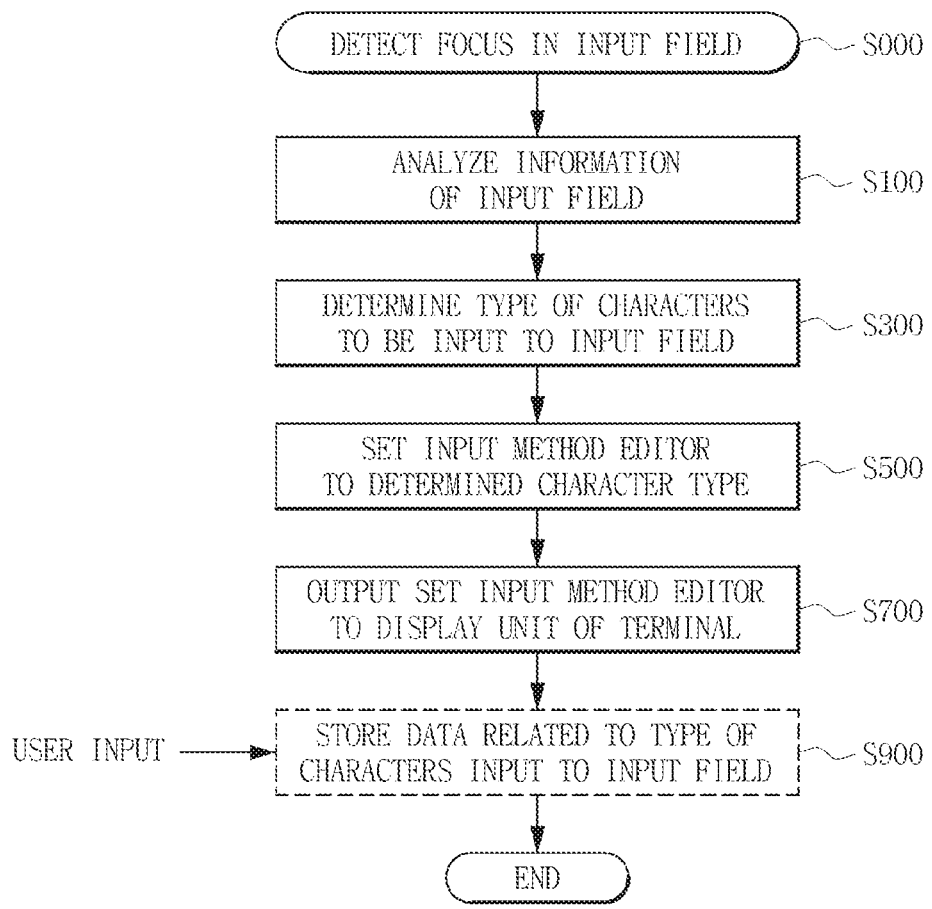
FIG. 6 is a flowchart illustrating a method for determining a type of an input method editor included in a terminal according to an exemplary embodiment of the present invention.
Figure 7:
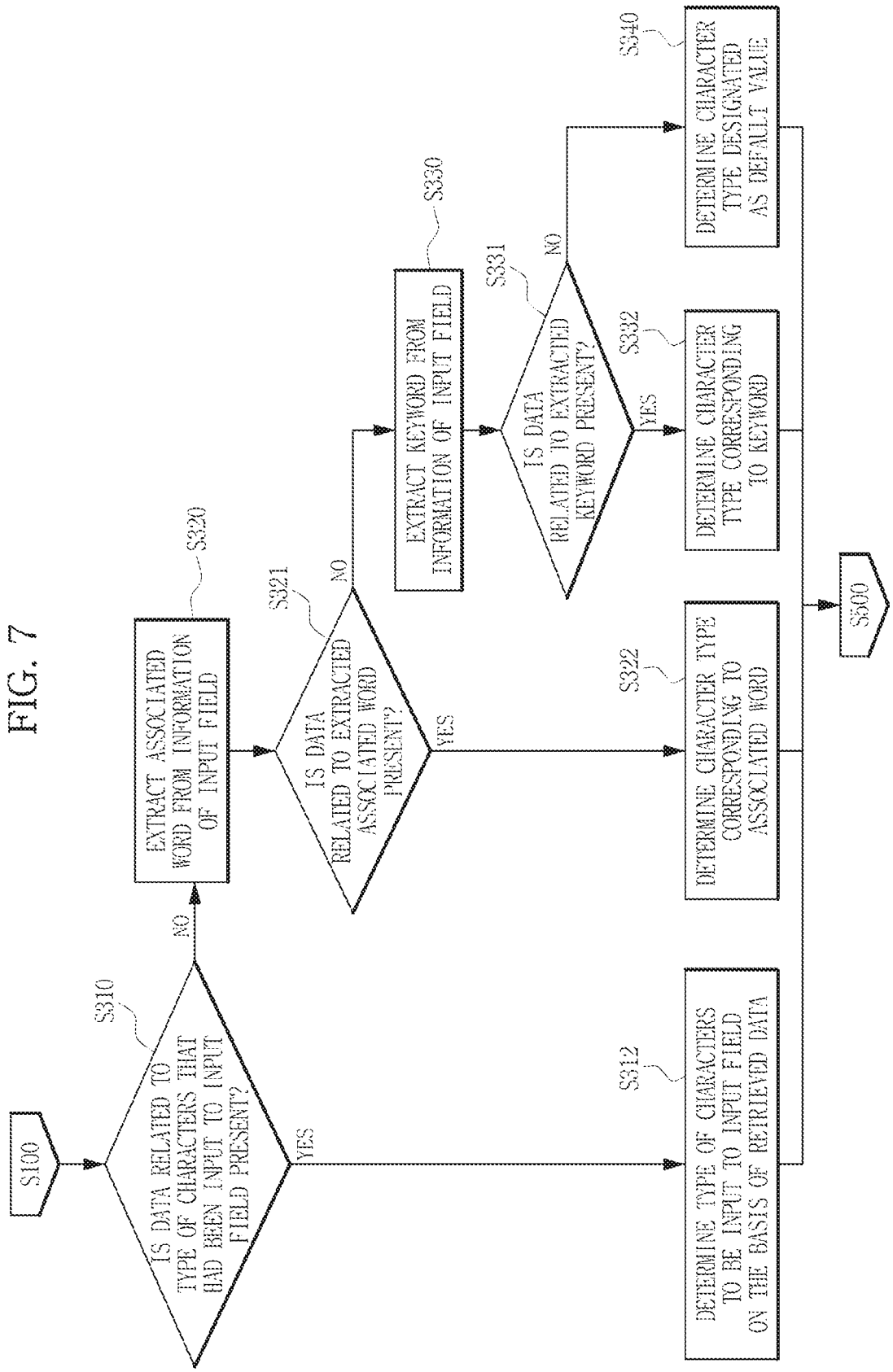
FIG. 7 is a flowchart illustrating a method for determining a character type of an input method editor according to an exemplary embodiment of the present invention.

FIG. 6 is a flowchart illustrating a method for determining a type of an input method editor included in a terminal according to an exemplary embodiment of the present invention. FIG. 7 is a flowchart for determining a character type of an input method editor according to an exemplary embodiment of the present invention.

The method of FIG. 6 will be described as if performed by the terminal 1 of FIG. 1, but is not limited thereto. Like elements which are the same as those of the terminal 1 of FIG. 1 are denoted by like reference numerals, and repeated descriptions will be omitted.

Referring to FIG. 6, the method for determining a character type of an input method editor in a terminal is started when a focus in an input field is detected while web browsing or an application is executed by the terminal 1 (S000). For example, the focus may be detected when a user touches or clicks on an input field to which the user seeks to input information.

When the focus is detected, information related to the input field is analyzed (S100). For example, the information related to the input field may include, without limitation, the input type of the input method editor. Further, the information related to the input field may be an HTML code.

In operation S300, the type of characters to be inputted in the input field may be determined based on the analyzed information of the input field or stored data related to the activity history of the input field. In operation S300, the processes of determining the type of characters to be inputted in the input field may be sequentially performed. When the character type is determined during the performed process, subsequent processes may not be performed, and the process may proceed to operation S500 or operation S700.

More specific processes of determining the type of characters to be input to the input field in operation S300 will be described with reference to FIG. 7.

Referring to FIG. 7, data related to a type of characters that had been inputted in the input field or the input method editor type corresponding to the input field is retrieved from an activity history database unit (e.g., activity history database unit 410 of FIG. 3) (S310). The activity history database unit may store data related to an input field that had received an input, types of characters that had been inputted in the input field, or an input method editor corresponding to the input field.

When the data related to the types of characters that had been inputted in the input field, or when the input method editor type corresponding to the input field is present, the type of characters to be inputted in the input field may be determined based on the data (S312). This process may be the first determination process, and when the character type is determined, the process proceeds to S500.

However, when the data related to the types of characters that had been inputted in the input field, or the input method editor type corresponding to the input field is not present, an associated word is extracted from the information of the input field (S320). The associated word may refer to a code that defines information to be displayed in front of or behind the input field in the HTML code. However, aspects of the invention are not limited thereto, such that the associated word may refer to information to be displayed above or below the input field When the associated word is extracted, data related to the extracted associated word is retrieved from an associated word database unit (e.g., associated word database unit 430 of FIG. 3) (S321). The associated word database unit may store associated words, which may be classified into categories of character types.

When the data related to the associated word is present, the character type of a category corresponding to the associated word is determined as the type of characters to be inputted in the input field (S322). This process may be the second determination process, and when the character type is determined, the process proceeds to S500.

However, when the data related to the associated word is not present, a keyword is extracted from the information of the input field (S330). The keyword may be a code that exemplifies information to be inputted in the input field in the input field in the HTML code.

When the keyword is extracted, data related to the extracted keyword is retrieved from the associated word database unit (S331). The associated word database unit may be the database used in the second determination process.

When the data related to the keyword is present, the character type of the corresponding keyword is determined as the type of characters to be input to the input field (S332). This process is the third determination process, and when the character type is determined, the process proceeds to operation S500.

However, when the data related to the keyword is not present, a character type designated as a default value is determined as the type of characters to be inputted in the input field (S340). However, aspects of the invention are not limited thereto, such that the character type may be determined based on a location of a terminal, source of the webpage or application, or information of the webpage or application corresponding to the input field. This process is the fourth determination process, and when the character type is determined, the process proceeds to operation S500. Although illustrated as occurring in an order in FIG. 7 and described as first to fourth determination processes, aspects need not be limited thereto such that the determination processes may occur in any order or may be simultaneously performed.

According to exemplary embodiments, the type of characters to be inputted in the input field may be determined as described above. Further, the type of characters to be inputted in the input field may be preferentially determined according to a user input, and the determined character type may be changed.

An operation of setting the input method editor corresponding to the input field to the determined character type when the type of characters to be inputted in the input field is determined in operation S300 may further be included (S500). The input method editor set to the determined character type is output to the display unit of the terminal (S700). The output input method editor may be displayed as an UI on the display unit of the terminal, and the user may input information through the input method editor. Although operations S500 and S700 are illustrated as occurring sequentially after operation S300, aspects need not be limited thereto such that operations S500 and S700 need not occur or may occur in a different order or simultaneously.

When the user inputs characters to the input field, data related to the input field and the type of characters inputted in the input field may be stored in the activity history database unit (S900). The data stored in the activity history database unit may be used as comparison data in the processes of determining the type of characters to be inputted in the input field.

According to exemplary embodiments, data related to an input field that had received a user input or data related to associated words or keywords from which a type of characters to be inputted in the input field is stored. Further, the type of characters to be inputted in the corresponding input field may be determined using the data. Therefore, since the input method editor may be set and be outputted based on the automatically determined text type, a process of changing the input method editor to another appropriate text type by the user may be omitted.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for determining an input method editor for a webpage in a terminal, comprising:
   setting a default language for the input method editor based upon one of a location of the terminal or a location of a source of the webpage;
   detecting a focus on an input field displayed on the terminal;
   analyzing information of the input field;
   determining a character type for the input field;
   determining an input type of the input field based on the information of the input field;
   setting the input method editor corresponding to the determined character type; and
   outputting the set input method editor as a virtual soft keyboard comprising the determined character type,
   wherein determining the character type comprises:
      extracting an associated word from within a reference proximity of the input field;
      retrieving data related to the associated word from an associated word database unit; and
      determining the character type based on the retrieved data.

2. The method of claim 1, wherein the information of the input field is in a Hyper Text Markup Language (HTML) format.

3. The method of claim 1, wherein the determining the character type further comprises:
   querying an activity history database to determine whether data related to the character type of the input field is present; and
   determining the character type based on the data.

4. The method of claim 1, wherein the determining the character type further comprises:
   extracting the associated word from the information of the input field.

5. The method of claim 4, wherein the associated word is information that describes or supplements information to be inputted in the input field.

6. The method of claim 1, wherein the determining the character type further comprises:
   extracting a keyword from the information of the input field;
   retrieving data related to the keyword from the associated word database unit; and
   determining the type of characters based on the retrieved data.

7. The method of claim 6, wherein the keyword is information that provides examples or exemplary format of information to be inputted in the input field.

8. A method for determining a type of input method editor for a webpage in a terminal, comprising:
- setting a default language for the input method editor based upon one of a location of the terminal or a location of a source of the webpage;
- detecting a focus on an input field displayed on the terminal;
- analyzing information of the input field;
- querying an activity history database to determine whether data related to a character type of the input field is present, and performing a first determination process if the data is present;
- extracting an associated word from within a reference proximity of the input field, querying an associated word database unit for data related to the associated word, and performing a second determination process if the queried data is present;
- extracting a keyword from the information of the input field, querying the associated word database unit for data related to the keyword, and performing a third determination process if the queried data is present;
- determining the type of input method editor to be outputted based on at least one of the first determination process, the second determination process, and the third determination process; and
- outputting the set input method editor as a virtual soft keyboard comprising the determined character type.

* * * * *